(12) United States Patent
Byron et al.

(10) Patent No.: US 9,760,564 B2
(45) Date of Patent: Sep. 12, 2017

(54) EXTRACTING VEILED MEANING IN NATURAL LANGUAGE CONTENT

(71) Applicant: International Business Machines Corporation, Armonk, NY (US)

(72) Inventors: Donna K. Byron, Petersham, MA (US); Benjamin L. Johnson, Baltimore, MD (US); Lakshminarayanan Krishnamurthy, Round Rock, TX (US); Krishna Kummamuru, Bangalore (IN); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 14/795,240

(22) Filed: Jul. 9, 2015

(65) Prior Publication Data
US 2017/0011026 A1    Jan. 12, 2017

(51) Int. Cl.
*G06F 17/28* (2006.01)
*G06F 17/27* (2006.01)

(52) U.S. Cl.
CPC ............................... *G06F 17/2785* (2013.01)

(58) Field of Classification Search
CPC ......... G06F 17/30654; G06F 17/30684; G06F 17/245; G06F 17/2705; G06F 17/2725; G06F 17/28; G06F 17/30424; G06F 17/30507; G06F 17/30554; G06F 17/30598; G06F 17/30675; G06F 17/3087; G06F 17/30917
See application file for complete search history.

(56) References Cited

U.S. PATENT DOCUMENTS

| 6,336,094 B1 | 1/2002 | Ferguson et al. |
| 7,167,825 B1 * | 1/2007 | Potter ..................... H04L 9/065 380/42 |
| 7,917,497 B2 * | 3/2011 | Harrison ........... G06F 17/30663 707/713 |

(Continued)

OTHER PUBLICATIONS

Harabagiu et al., "Answering Complex Questions with Random Walk Models", SIFIR'06, Aug. 6-11, 2006, Seattle, WA, pp. 220-227.*

(Continued)

*Primary Examiner* — Abdelali Serrou
(74) *Attorney, Agent, or Firm* — Stephen J. Walder, Jr.; Diana R. Gerhardt

(57) ABSTRACT

Mechanisms for identifying hidden meaning in a portion of natural language content are provided. A primary portion of natural language content is received and a secondary portion of natural language content is identified that references the natural language content. The secondary portion of natural language content is analyzed to identify indications of meaning directed to elements of the primary portion of natural language content. A probabilistic model is generated based on the secondary portion of natural language content modeling a probability of hidden meaning in the primary portion of natural language content. A hidden meaning statement data structure is generated for the primary portion of natural language content based on the probabilistic model.

17 Claims, 4 Drawing Sheets

(56) References Cited

U.S. PATENT DOCUMENTS

| | | | |
|---|---|---|---|
| 8,412,732 B2* | 4/2013 | Crocker | G06F 17/30507 705/35 |
| 8,560,567 B2* | 10/2013 | Azzam | G06Q 10/107 707/769 |
| 8,880,388 B2* | 11/2014 | Ferrucci | G06F 17/2785 704/7 |
| 9,064,762 B2 | 6/2015 | Yamaguchi | |
| 9,153,142 B2* | 10/2015 | Bagchi | G09B 7/02 |
| 9,213,771 B2* | 12/2015 | Chen | G06F 17/30867 |
| 9,613,317 B2* | 4/2017 | Beamon | G06N 99/005 |
| 2003/0233224 A1* | 12/2003 | Marchisio | G06F 17/271 704/4 |
| 2005/0261891 A1* | 11/2005 | Chan | G06F 17/27 704/9 |
| 2009/0287678 A1 | 11/2009 | Brown et al. | |
| 2010/0235164 A1* | 9/2010 | Todhunter | G06F 17/279 704/9 |
| 2010/0262599 A1 | 10/2010 | Nitz | |
| 2011/0066587 A1 | 3/2011 | Ferrucci et al. | |
| 2011/0125734 A1 | 5/2011 | Duboue et al. | |
| 2012/0301864 A1* | 11/2012 | Bagchi | G09B 7/02 434/362 |
| 2012/0330882 A1* | 12/2012 | Ferrucci | G06N 7/005 706/52 |
| 2013/0007055 A1 | 1/2013 | Brown et al. | |
| 2013/0018652 A1 | 1/2013 | Ferrucci et al. | |
| 2013/0029307 A1* | 1/2013 | Ni | G06N 99/005 434/322 |
| 2013/0066886 A1 | 3/2013 | Bagchi et al. | |
| 2013/0325756 A1* | 12/2013 | He | G06K 9/628 706/12 |
| 2014/0281846 A1 | 9/2014 | Sorin et al. | |
| 2014/0298199 A1* | 10/2014 | Johnson, Jr. | G06Q 10/101 715/753 |

OTHER PUBLICATIONS

Lin et al., "An Analysis of Multi-Focus Questions", Proceedings of the SIGIR 2008 Workshop on Focused Retrieval, pp. 30-36.*

Derczynski et al., "Information Retrieval for Temporal Bounding", Proceeding: ICTIR '13 Proceedings of the 2013 Conference on the Theory of Information Retrieval, pp. 129-130.*

Brown, Peter F. et al., "The Mathematics of Statistical Machine Translation: Parameter Estimation", Computational Linguistics, 19(2):263-311, Jun. 2003, 50 pages.

Cheushev, V., "The document understanding technology in modern information systems", International conference on new information technologies in education No2, Minsk, Dec. 11, 1996, pp. 351-360 (Abstract provided).

High, Rob, "The Era of Cognitive Systems: An Inside Look at IBM Watson and How it Works", IBM Corporation, Redbooks, Dec. 12, 2012, 16 pages.

Kloptchenko, Antonina et al., "Combining Data and Text Mining Techniques for Analyzing Financial Reports", Eighth Americas Conference on Information Systems, Aug. 9-11, 2002, pp. 20-28.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

EXTRACTING VEILED MEANING IN NATURAL LANGUAGE CONTENT

BACKGROUND

The present application relates generally to an improved data processing apparatus and method and more specifically to mechanisms for extracting hidden or veiled meaning in natural language content.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system comprising a processor and a memory, for identifying hidden meaning in a portion of natural language content is provided. The method comprises receiving, by the data processing system, a primary portion of natural language content and identifying, by the data processing system, a secondary portion of natural language content that references the natural language content. The method further comprises analyzing, by the data processing system, the secondary portion of natural language content to identify indications of meaning directed to elements of the primary portion of natural language content. Moreover, the method comprises generating, by the data processing system, a probabilistic model based on the secondary portion of natural language content modeling a probability of hidden meaning in the primary portion of natural language content. In addition, the method comprises generating, by the data processing system, a hidden meaning statement data structure for the primary portion of natural language content based on the probabilistic model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
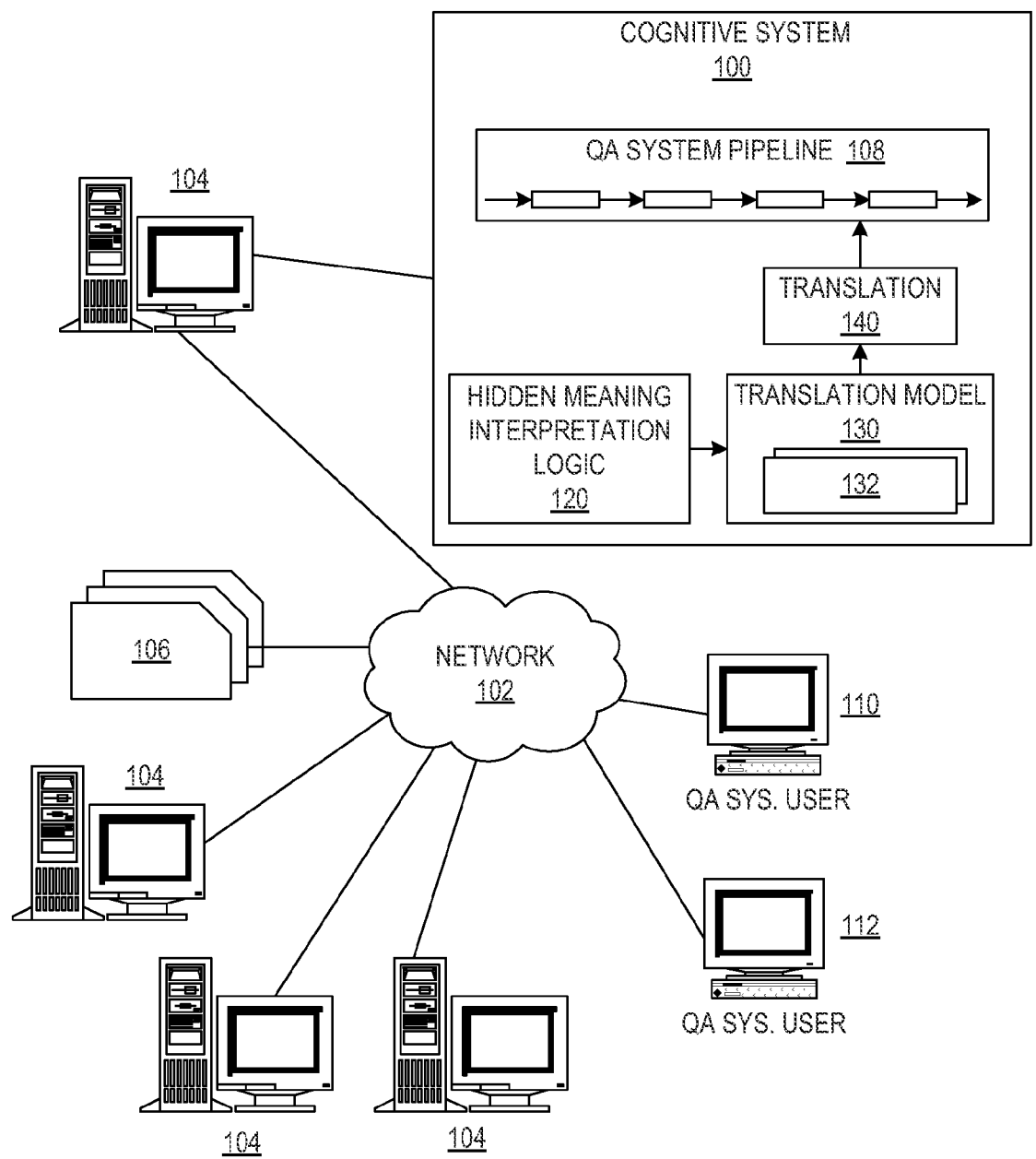
FIG. 1 depicts a schematic diagram of one illustrative embodiment of a question/answer creation (QA) system in a computer network.

The illustrative embodiments provide mechanisms for extracting the hidden or veiled meaning in natural language content. The illustrative embodiments utilize secondary sources of information that provide commentary or analysis of the natural language content, some prior to the publication of the natural language content and some in response to the publication of the natural language content, to provide evidentiary sources for interpreting the natural language content and extracting the hidden, implied, or veiled meaning from the natural language content. Moreover, the illustrative embodiments provide mechanisms for utilizing the hidden or veiled meaning extracted from the natural language content to improve analysis of the natural language content by cognitive systems when performing cognitive operations, such as providing predictive models in various domains, question answers, information retrieval, content searching, or the like. The mechanisms of the illustrative embodiments may generate metadata or other content to supplement the original natural language content so as to make explicit the hidden, implied, or veiled meaning in the natural language content so that this metadata or supplemental content may be utilized by the cognitive systems.

Essentially, the problem addressed by the mechanisms of the illustrative embodiments is that often times human beings have hidden, implied, or veiled meaning in the natural language that they utilize. As a result, natural language processing systems, which operate on the literal meaning of the terms and phrases found in natural language content, cannot identify this hidden, implied, or veiled meaning and instead may come to an incorrect conclusion as to what the natural language content is stating based on the literal meaning. For example, announcements by organizational, governmental, and business leaders, politicians, spokespersons, public relations individuals, and the like, often utilize language that attempts to provide information while hiding or at least obscuring the real meaning behind the announcement by utilizing specific combinations of terms and phrases that are ambiguous in their meaning.

For example, an announcement from a financial leader, such as a company earnings report or Federal Research chair testimony, often contains hidden meaning in the "economese" used in the announcement. Take as an example the statement "Federal Reserve Chair Janet Yellen said Friday that the Great Recession complicated the Fed's ability to assess the U.S. job market and made it harder to determine when to adjust interest rates." Taken literally, this statement means that it is hard to assess the U.S. job market and adjust interest rates due to the Great Recession. However, it may be determined that the hidden meaning in this statement is that the U.S. job market is poor and interest rates will not be adjusted any time soon. However, known natural language processing systems will not be able to ascertain this hidden meaning when processing the statement since they are limited by the understanding of only the literal meaning of the terms and phrases used in the natural language content itself.

The illustrative embodiments utilize secondary sources, also referred to herein as Analysis Articles (AA), to extract the hidden, implied, or veiled meaning in such natural language content. The secondary sources are sources of natural language content that indicate what is expected to be stated in the natural language content or is commentary on what is/was stated in the natural language content. For example, statements of pundits and commentators regarding the natural language content both prior to the publication of the natural language content and contemporaneously or after publication of the natural language content may be utilized. As an example, consider a political pundit that may, in anticipation of an announcement by the President of the United States, issue a prediction that the President is going to state that the economy is improving but not at the pace that they would like to see. Moreover, this pundit may further state that this means that the economy is stagnant and the job market is not improving over previous months. This information may be analyzed and used to interpret the content of the later announcement from the President which may include a statement of the type that the "economy has shown improvement in recent months."

Various domains utilize their own implication lexicon that is a set of terms and phrases that imply, veil, or otherwise obfuscate the real meaning in a statement. For example, specific types of terms/phrases are often used in politics to evade, give a false impression, or otherwise obscure the actual underlying facts, beliefs, opinions, and the like, of a statement. Similar implication lexicons exist for the financial domain, business domain, healthcare domain, and the like. Sometimes this hiding or obfuscating of the underlying information in the statement is based on good intentions, e.g., avoiding unnecessary worry or panic, and sometimes it is founded on bad intensions, e.g., misleading or falsifying information. The issue in determining what the underlying information is for a statement, which has been hidden or obfuscated, is one of translation using a knowledge of the implication lexicon of the particular domain.

The illustrative embodiments obtain information about this implication lexicon from the secondary sources, or Analysis Articles (AA), as mentioned above. The illustrative embodiments apply statistical machine translation and textual entailment techniques to the issue of decoding the hidden meaning of language about a particular domain, e.g., economic or financial domain, political domain, business domain, or the like. After computing the translation of a particular portion of natural language content, a new translated natural language content is generated and/or metadata is generated, that includes the hidden meaning explicitly stated. This new translated natural language content with the hidden meaning explicitly stated, referred to herein as the explicit meaning natural language content (or text), may be used by the cognitive system operating on natural language content to perform a cognitive operation. It should be appreciated that this "translation" of the original natural language content into the explicit meaning natural language content is different than known machine based translation operations in that the semantics of the original natural language context are actually being altered and augmented in the explicit meaning natural language content such that the literal meaning of the explicit meaning natural language content is different from the original natural language content.

Hereafter the term "natural language content" will be referred to simply as "text" for ease of reading. However, it is should be appreciated that the term "text" does not mean any random combination of alphanumeric characters, but rather natural language content that is structured in accordance with known natural languages spoken by human beings. That is, the term "text" refers to a combination of terms and/or phrases presented in a natural language form such that concepts and meaning are associated with the combination of terms and/or phrases. The text may be single statements, phrases, paragraphs, entire documents, a plurality of documents, or any other portion of text. Moreover, it should be appreciated that while the illustrative embodiments are described in terms of text, the mechanisms of the illustrative embodiments may be applied to audible content as well. In such a case, such audible content may be converted to a textual form to perform the operations of the illustrative embodiments using the mechanisms described herein. However, for ease of explanation, it will be assumed that the content that the illustrative embodiments operate on are provided in a textual format, whether originally or in response to a speech to text conversion.

In identifying the hidden meaning in a primary or original text, the illustrative embodiments first identify aligned secondary texts that explain the meaning of the primary text. The secondary texts are "aligned" in that they reference the persons, events, concepts, or explicit content in the primary or original text, or reference the primary or original text as a whole. For example, Analysis Articles (AAs) with text that reference the actual terms/phrases in the primary text, persons, concepts, events, or other content of the primary text, or the like, are identified as aligned secondary texts. This may include identifying AAs that have temporal characteristics that are within a given tolerance of the temporal characteristics of the primary text. For example, articles referring to content in an Original Financial Leader Announcement (OFLA), e.g., an AA that refers to "The recent announcement by Fed chairman . . . ," and which have a composition, posting, or other publication date information that is within a day, week, month, or other acceptable predetermined time period, of the OFLA, may be selected as AAs that are associated with the OFLA.

Once the aligned secondary texts are identified, then the aligned secondary texts may be analyzed using natural language processing techniques and various other types of syntactic and semantic based analyses to identify portions of the aligned secondary texts that directly reference the primary or original text itself, or reference elements of the primary or original text, such as by title, persons, events, concepts, or explicit content of the primary or original text. Many different types of analysis may be used to identify portions of the aligned secondary texts that are directed to referencing the primary text. For example, as part of this process, the aligned secondary texts may look for direct quotes from the primary text included in the secondary texts. For example, such direct quotes may be lexically signaled by the way of quotation marks in the aligned secondary text, or a comparison of the primary text and the aligned secondary text may result in matching portions, e.g., sentences, phrases, or the like. Other indicators may be indentions, tags, or the like. Moreover, the aligned secondary text may be searched for descriptive language that describes the primary text or content of the primary text. Furthermore, the aligned secondary text may have explicit links to the primary text, lists of sources of information that include a reference to the primary text, or the like, that may be identified by way of this analysis. Any analysis that is able to identify a reference by the aligned secondary text to the primary text itself or the content, concepts, events, persons, etc., associated with the primary text may be used without departing from the spirit and scope of the illustrative embodiments.

In general, the identified portions, or segments, of the aligned secondary texts may be classified into three different types. A first type comprises portions of the secondary texts that refer to the primary text itself, concepts, persons, events, or other explicit content of the primary text. A second type comprises portions of the aligned secondary texts that attempt to decode the hidden, implied, or veiled meaning of portions of the primary text, offer projected impact statements, etc. A third type comprises statements or remarks in the aligned secondary texts that are directed to specifying missing or expected elements of the primary text that were not in fact included in the primary text, e.g., "Yesterday's statement was expected to provide a time line . . . . However, it failed to do that. This means that the Fed . . . "

Having found the aligned secondary texts and found the portions of the aligned secondary texts that reference the primary text, if any, these portions are further analyzed to extract indications of meaning in the aligned secondary text that reference the meaning of portions of the primary text, e.g., the second and third types of text portions in the aligned secondary texts discussed above. These portions of the aligned secondary texts are associated with portions of the primary text that they purport to refer to or otherwise are identified as referencing through analysis of the aligned secondary texts, e.g., the first type of text portions mentioned above, to thereby generate pairings of meaning from the aligned secondary texts and portions of the primary text.

Temporal relation extraction, such as references to time periods or verb tense, may be performed on the secondary texts to determine whether the secondary text is referring to the primary text in the future tense or past tense, e.g., secondary texts that are predictive in nature and secondary texts that are reactionary. The pairings of the meaning to portions of the primary text may be sorted according to whether they are predictive or reactionary. Predictive secondary texts may have a different level of value in determining the hidden meaning in the primary text than reactive secondary texts. For example, the pairings of predictive secondary texts may be weighted less than the pairings of reactive secondary texts when generating evaluating evidence in a probabilistic model for translating the primary text.

Optionally, in one illustrative embodiment, the pairings of meaning extracted from the one or more secondary texts to portions of the primary text may be annotated with contextualizing features that record "current" domain conditions, e.g., current economic or financial conditions, relevant to the concept, person, event, or other content being analyzed in the portion of the primary text in the pairing, where "current" refers to a time period contemporaneous with the timeframe associated with the portion of the primary text. These may be key performance indicators (KPIs) of interest to the particular domain, e.g., for an economic domain this may include revenue growth values for a covered time period, unemployment rate information for the covered time period, debt commitments, etc. These KPIs can be included in annotations of the pairings as conditional probabilities for the translation model, e.g., if a OFLA statement contains X, and unemployment rate is Y, this means the hidden meaning in X is Z, where X is a portion of the primary text, Y is an annotated KPI, and Z is the extracted meaning from the one or more secondary texts.

Each pairing may further be annotated with domain-specific semantic analysis results using deep natural language processing (NLP) techniques. For example, such deep NLP techniques are utilized in the IBM Watson™ question and answer (QA) system available from International Business Machines (IBM) corporation of Armonk, N.Y. These deep NLP techniques extract features of the natural language text that may be domain-specific. For example, indicators of sentiment (positive, negative, questionable, etc.), quantitative relations such as measures that are increasing or decreasing, domain specific concept values, such as fiscal health concepts, e.g., liquidity, or the like may be identified via deep NLP techniques and the identified information added as annotations to the pairing. These extracted features may be extracted from one or more of the primary text or the secondary text.

In some illustrative embodiments, all of the pairings of meaning to a particular portion of the primary text may be analyzed to identify a consensus opinion as to the meaning of that portion of the primary text. For example, if 10 different secondary texts provide comment on the same portion X of the primary text, then the extracted meanings obtained from these secondary texts will result in 10 different pairings with the same portion X. These 10 different pairings may be analyzed to identify a consensus opinion as to the meaning of the portion X. This consensus may be a majority opinion, for example. This consensus may be an alternative subset of meanings from the set of extracted meanings corresponding to the different pairings. Other alternatives for analyzing the collection of pairings directed to the same portion of the primary text may also be utilized with the results maintained as an annotation to the pairing.

Finally, the translation model uses the pairings and their annotations to generate parallel text examples for setting forth the hidden meaning in the primary text. For example, the primary text portion of the type "The US economy has stabilized" may be translated to a parallel statement explicitly setting forth the extracted hidden meaning corresponding to a pairing, such as a hidden meaning statement of the type "Unemployment rates have stopped falling." The probabilistic model of pairings built above may employ Bayesian reasoning algorithms or any other machine learning techniques or algorithms that incorporate parallel text analysis to select a most probable hidden meaning in each portion of the primary text. Unlike traditional machine translations scenarios in which two parallel texts are expected to include the same objects, predicates, and values, the extracted meaning statements and portions of text from the primary text may express widely different content. That is, in the example, above, the primary text expresses the content that the US economy has stabilized, whereas the hidden meaning statement expresses the concept that unemployment rates have stopped falling, which are two different contents even though one means the other.

The parallel text analysis may be utilized to identify the most probable hidden meaning of the primary text which may then be subjected to further cognitive processing and/or output of the most probable hidden meaning. For example, the primary text portion may be displayed side-by-side with the hidden meaning statement to illustrate what the primary text portion actually means. In other illustrative embodiments, a range of potential hidden meaning statements may be displayed. In other illustrative embodiments, the primary text may be augmented with references to the linked secondary text portions, augmented with annotations or metadata that include the hidden meaning statements, or the like. In one illustrative embodiment, the primary text is augmented with the metadata including the hidden meaning statement text(s) such that this metadata is searchable and able to be processed by the cognitive system when analyzing the primary text. In this way, the cognitive system will not only see the literal meaning of the original primary text, but also the hidden meaning in the original primary text which can then be processed using literal-based NLP techniques, since the hidden meaning is now made explicit in the metadata.

Thus, the illustrative embodiments provide mechanisms for extracting the hidden, implied, or veiled meaning in natural language text and making the hidden, implied, or veiled meaning explicit. As a result, cognitive systems may make use of the now explicitly indicated hidden meaning when processing the original text so as to improve the operation and accuracy of the cognitive system.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
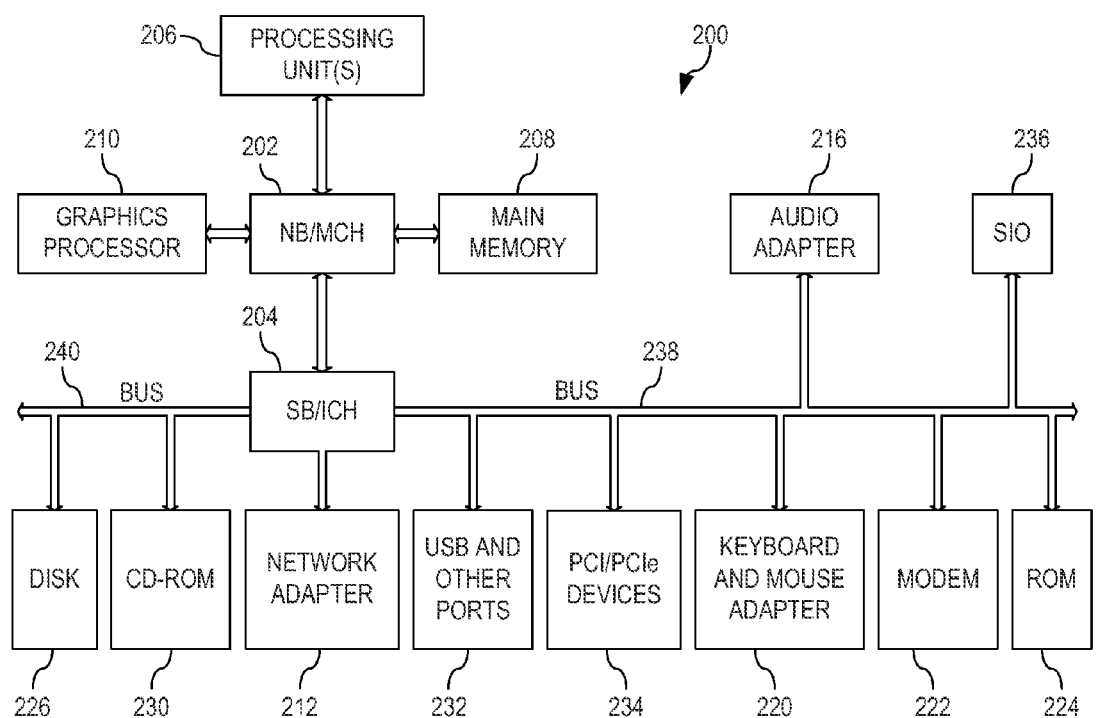
FIG. 2 is a block diagram of an example data processing system in which aspects of the illustrative embodiments are implemented.
Figure 3:
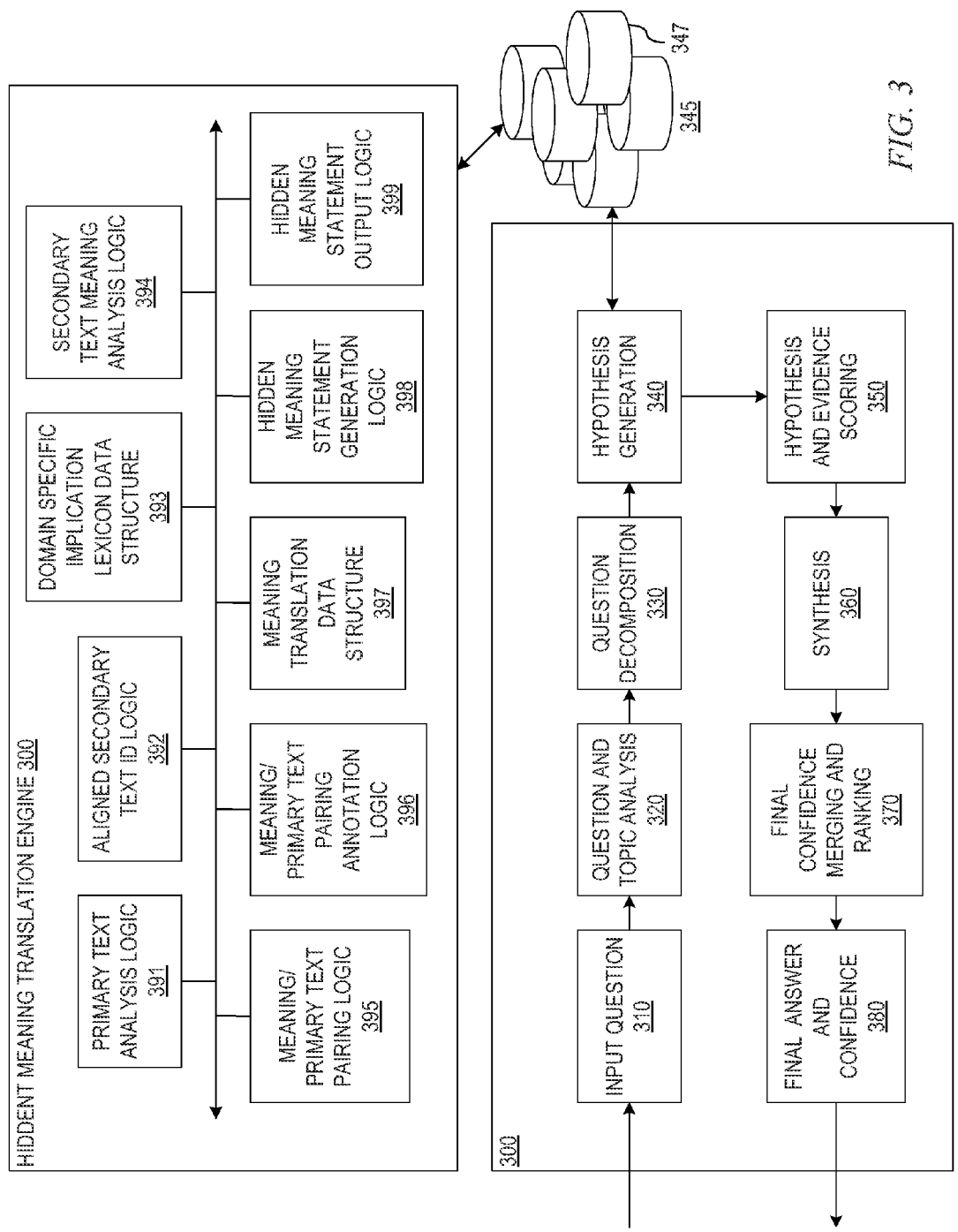
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, in some illustrative embodiments, the mechanisms described herein are integrated in, augment, and extend the functionality of a cognitive system with regard to identifying hidden, implied, or veiled meaning in natural language content. In particular, the mechanisms of the illustrative embodiments identify aligned secondary text sources that provide information regarding interpretations of the primary text and use these to determine a most probable hidden, implied, or veiled meaning in the primary text. This is information may then be utilized by the cognitive system when performing its cognitive operations.

Since the illustrative embodiments will be described in the context of augmenting the operation of a cognitive system, and in particular a cognitive system that implements a question and answer system having one or more question and answer (QA) pipelines, it is important to first have an understanding of how question and answer creation in a cognitive system implementing a QA pipeline is implemented before describing how the mechanisms of the illustrative embodiments are integrated in and augment such mechanisms. It should be appreciated that the cognitive system and QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include hidden meaning interpretation logic 120 implemented in specialized hardware, software executed on hardware, or any combination of specialized hardware and software executed on hardware, for implementing a hidden, implied, or veiled meaning in natural language content (or text). As discussed above, the hidden meaning interpretation logic 120 operates to identify aligned secondary content or text that provides information for interpreting the hidden meaning in a primary portion of natural language content (or text). The hidden meaning interpretation logic 120 further generates a translation model 130 of the primary text comprising one or more meaning interpretation data structures 132 that define associations of hidden meaning with portions of the primary text. These data structures 132 may indicate associations of segments of the secondary text that purport to provide meaning, with portions of the primary text to which they refer. Such data structures 132 may further comprise temporal reference information, contextualization features, domain-specific deep NLP features, and the like. From these data structures 132, probabilistic analysis is performed by the hidden meaning interpretation logic 120 to determine, for the primary text, the most probable hidden, implied, or veiled meaning in the primary text. The selected most probable hidden, implied, or veiled meaning is then used to generate a translated natural language statement 140 that is output and/or used as a basis for modifying the primary text with annotations and/or metadata explicitly stating the hidden, implied or veiled meaning. The QA system pipeline 108 may then utilize this annotation/metadata along with the primary text when performing question answering as an addition to the corpus of information upon which it operates thereby improving the accuracy of the QA system pipeline 108 and the cognitive system 100 as a whole.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, The QA system pipeline 300 works in conjunction with a hidden meaning translation engine 390 which is configured to identify and extract, through a probabilistic model, the hidden or veiled meaning in natural language content. The hidden meaning translation engine 390 comprises primary text analysis logic 391, aligned secondary text identification logic 392, a domain specific implication lexicon data structure 393, secondary text meaning analysis logic 394, meaning/primary text pairing logic 395, meaning/primary text pairing annotation logic 396, meaning translation data structure 397, hidden meaning statement generation logic 398, and hidden meaning statement output logic 399. The elements 390-399 may be implemented in software executed on hardware of one or more data processing systems or computing devices, specifically configured hardware devices for implementing the functionality of these elements, or any combination of software executed on hardware and/or specifically configured hardware devices. In one illustrative embodiment, the elements 390-399 are implemented as software instructions executed by processors, utilizing memories and other hardware devices, of one or more data processing systems.

The operation of the hidden meaning translation engine 390 may be initiated manually or automatically in response to the issuance of a portion of natural language content (or text) which is suspected of having hidden, implied, or veiled meanings. Typically, such natural language content (or text) may comprise governmental or commercial organization announcements, e.g., financial, economic, political, etc. announcements. For example, such natural language content may be a Federal Reserve chair hearing document, a product press release, a business' annual report, or the like. Moreover, initiation may occur in response to a human analyst requesting documents pertaining to an issuing entity over a time period, e.g., the most recent fiscal quarter. These are only examples and the illustrative embodiments are not limited to such.

The natural language content, or a pointer to the natural language content, that is the subject of the processing by the illustrative embodiments, referred to as the primary text, is input to the hidden meaning translation engine 390 along with a request for translation of any hidden meanings within the primary text. In response, the primary text analysis logic 391 performs initial NLP operations on the primary text to extract features of the primary text. This may also be done utilizing the mechanisms of the QA system pipeline 300 which performs similar extraction of features on input questions and evidential passages in the corpus. As part of this feature extraction, key terms, key phrases, temporal characteristics, concepts, persons, places, events, title information, and the like, may be identified in the primary text.

These extracted features may be utilized by the aligned secondary text identification logic 392 to identify aligned secondary text. That is, the aligned secondary text identification logic 392 identifies other text within the corpora/corpus of information 345, 347 that is "aligned" in that they reference the persons, events, concepts, contain the same key terms, key phrases, have links to, explicitly reference the title of, or otherwise have explicit matching content with the primary text. For example, Analysis Articles (AAs) with text that reference the actual terms/phrases in the primary text, persons, concepts, events, title, contains a link to, or contains other content of the primary text, or the like, are identified as aligned secondary texts. This may include identifying AAs that have temporal characteristics that are within a given tolerance of the temporal characteristics of the primary text as noted above, e.g., statements such as "The recent announcement by the chairman of XYZ Corporation . . . ," and which have a composition, posting, or other publication date information that is within a day, week, month, or other acceptable predetermined time period, of the announcement mentioned in the statement, may be selected as AAs that are associated with the announcement.

Once the aligned secondary texts are identified via the aligned secondary text identification engine 392, then the aligned secondary texts may be analyzed by the secondary text meaning analysis logic 394 using natural language processing techniques and various other types of syntactic and semantic based analyses to identify portions of the aligned secondary texts that directly reference the primary or original text itself, such as by title, persons, events, concepts, or explicit content of the primary or original text. Thus, while the aligned secondary text identification engine 392 performs a first level of association between the primary text and the secondary texts to thereby identify the aligned secondary texts, the secondary text meaning analysis logic 394 identifies the portions of content within the aligned secondary texts that reference the primary text in some way.

Many different types of analysis may be used to identify portions of the aligned secondary texts that are directed to referencing the primary text. For example, as part of this process, the secondary text meaning analysis logic 394 may identify, within the aligned secondary texts direct quotes from the primary text included in the secondary texts. For example, such direct quotes may be lexically signaled by the way of quotation marks in the aligned secondary text, or a comparison of the primary text and the aligned secondary text may result in matching portions, e.g., sentences, phrases, or the like. Other indicators may be indentions, tags, or the like which may be identified by the analysis performed by the secondary text meaning analysis logic 394. Moreover, the aligned secondary text may be searched, by the secondary text meaning analysis logic 394 for descriptive language that describes the primary text or content of the primary text. Furthermore, the secondary text meaning analysis logic 394 may identify within the aligned secondary text explicit links to the primary text, lists of sources of information that include a reference to the primary text, or the like. Of course keyword and key phrase searching, along with synonym, antonym, and other semantic and syntactic analysis may be utilized as well. Any analysis that is able to identify a reference by the aligned secondary text to the primary text itself or the content, concepts, events, persons, etc., associated with the primary text may be used by the secondary text meaning analysis logic 394 without departing from the spirit and scope of the illustrative embodiments.

As noted above, the identified portions, or segments, of the aligned secondary texts may be classified into three different types. A first type comprises portions of the secondary texts that refer to the primary text itself, concepts, persons, events, or other explicit content of the primary text. A second type comprises portions of the aligned secondary texts that attempt to decode the hidden, implied, or veiled meaning of portions of the primary text, offer projected impact statements, etc. A third type comprises statements or remarks in the aligned secondary texts that are directed to specifying missing or expected elements of the primary text that were not in fact included in the primary text, e.g., "Yesterday's statement was expected to provide a time line . . . . However, it failed to do that. This means that the Fed . . . "

Having found the aligned secondary texts via the operation of the aligned secondary text identification engine 392, and found the portions of the aligned secondary texts that reference the primary text if any, via the operation of the secondary text meaning analysis logic 394, these portions are further analyzed by the secondary text meaning analysis logic 394 to extract indications of meaning in the aligned secondary text that reference the meaning of portions of the primary text, e.g., the second and third types of text portions in the aligned secondary texts discussed above. In extracting indications of meaning from identified portions of the aligned secondary text that reference the primary text, various general and domain specific dictionaries of terms/phrases, the domain specific implication lexicon data structure 393, and the like, may be used to match known general and domain specific key terms, key phrases, and the like, that are present within the portions of the aligned secondary texts that are indicative of referencing the meaning of another portion of text. The secondary text meaning analysis logic 394, in conjunction with the meaning/primary text pairing logic 395 to correlate those specific key terms, key phrases, and the like, with their associated meanings, e.g., in a domain associated with national financial markets, the term "economic stability" may be associated with "job creation is stagnant", "job loss has slowed", and/or a plurality of other known associations of hidden meaning. These associations may be learned through machine learning techniques as discussed hereafter. These portions of the secondary texts are paired with the corresponding portions of the primary text to which they correspond to thereby generate meaning text/primary text pairing data structures using meaning/primary text pairing logic 395.

The secondary text meaning analysis logic 394 may further perform temporal relation extraction, such as references to time periods or verb tense, on the identified portions of the secondary texts to determine whether the secondary text is referring to the primary text in the future tense or past tense, e.g., secondary texts that are predictive in nature and secondary texts that are reactionary. The pairings of the meaning text to portions of the primary text, in the meaning/ primary text pairing data structures, may be sorted according to whether they are predictive or reactionary. Predictive secondary texts may have a different level of value in determining the hidden meaning in the primary text than reactive secondary texts. For example, the pairings of predictive secondary texts may be weighted less than the pairings of reactive secondary texts when generating evaluating evidence in a probabilistic model for translating the primary text.

For example, a secondary text may state that "Tomorrow's announcement from the CEO of XYZ Corporation is expected to indicate a second quarter of better than expected earnings" where the term "tomorrow" is identified as an extracted temporal characteristic which is indicative of the secondary text being predictive, the terms "announcement" and "CEO of XYZ Corporation" are terms identified as referencing a particular event by a particular person which can then be used to correlate with the primary text which is an annual financial report announcement by the CEO of XYZ Corporation, and the terms "second quarter" and "better than expected earnings" may be used to correlate to content in the primary text that references the concepts of earnings in the second quarter of the fiscal year. For example, in the primary text, the statement "We have seen growth in the second quarter" may be correlated to a hidden meaning of "better than expected earnings" as identified in the secondary text. However, there may be another secondary text that is reactionary in nature, e.g., "Today's announcement by CEO Fred Miller of XYZ Corporation generically stated that the company saw growth in the second quarter which is indicative that the growth was not as large as previously thought." In this case, the reactionary secondary text may be used to correlate the hidden meaning association of "growth in the secondary quarter" with "growth that was not as large as previously thought."

Different weightings may be given to these two associations based on whether they are predictive or reactionary. In one illustrative embodiment, reactionary secondary text portions are given a higher weighting than predictive secondary text portions since reactions tend to be more accurate than predictions in cases where expected content is in fact present. In cases where predictive secondary text expects certain content to be present in the primary text, and this content is in fact missing from the primary text, then the predictive secondary text may be more accurate due to the fact that it illustrates hidden meaning in missing content. Alternatively, if reactionary secondary text references "missing" or non-included content and what the lack of such content means, then this reactionary secondary text may be given a higher weighting. The weightings may be set according to the type of secondary text portions and the content of the secondary text portions. These weightings are utilized, as described hereafter, in the probabilistic model for determining the most probable correlation of hidden meaning with the portions of the primary text based on the various pairings with the portions of the primary text.

Optionally, in one illustrative embodiment, the pairings of meaning text extracted from the one or more secondary texts to portions of the primary text may be annotated, by the meaning/primary text pairing annotation logic 396, with contextualizing features that record current domain conditions, e.g., current economic or financial conditions, relevant to the concept, person, event, or other content being analyzed in the portion of the primary text in the pairing. These may be key performance indicators (KPIs) of interest to the particular domain, e.g., for an economic domain this may include revenue growth values for a covered time period, unemployment rate information for the covered time period, debt commitments, etc. These KPIs can be included in annotations of the pairings as conditional probabilities for the translation model, e.g., if a government financial statement contains X, and unemployment rate is Y, this means the hidden meaning in X is Z, where X is a portion of the primary text, Y is an annotated KPI, and Z is the extracted meaning from the one or more secondary texts.

Each pairing may further be annotated, by the meaning/primary text pairing annotation logic 396, with domain-specific semantic analysis results using deep natural language processing (NLP) techniques. For example, such deep NLP techniques are utilized in the IBM Watson™ question and answer (QA) system available from International Business Machines (IBM) corporation of Armonk, N.Y. These deep NLP techniques extract features of the natural language text that may be domain-specific. For example, indicators of sentiment (positive, negative, questionable, etc.), quantitative relations such as measures that are increasing or decreasing, domain specific concept values, such as fiscal health concepts, e.g., liquidity, or the like may be identified via deep NLP techniques and the identified information added as annotations to the pairing.

The various annotated pairings of meaning text portions with primary text portions may be stored as part of the meaning translation data structure 397. All of the pairings of meaning text portions to a particular portion of the primary text may be analyzed by the hidden meaning statement generation logic 398 to identify a consensus opinion as to the meaning of that portion of the primary text. Each pairing is evaluated based on the meaning ascribed to the primary portion of text, the predictive/reactionary nature of the meaning text, the particular annotations of the pairing, any supportive evidential text in the corpus of information 345, 347 identified using known NLP mechanisms, and the like. Each of the pairings may be evaluated to identify a quantitative probabilistic value indicative of the probability that the pairing represents the hidden meaning behind the primary text portion. In generating these quantitative probabilistic values, the amount of support that one pairing obtains from other similar pairings may be determined so as to indicate a consensus of the pairings and increase/decrease the corresponding quantitative probabilistic value. For example, if one pairing represents a particular hidden meaning association, and another pairing represents a similar hidden meaning, these may represent a higher level of consensus between these pairings indicative of a higher probability that these pairings represent a valid hidden meaning behind the primary text portion. Similarly, if a pairing does not have corroboration from other pairings, then this is indicative of a relatively lower probability that this pairing represents a valid hidden meaning.

Consider an example in which deep Natural Language Processing (NLP) on a first Analysis Article (AA1) results in the following decodings, or interpretations, corresponding to potential hidden meaning pairings of the decoding with one particular statement in a OFLA:
  1) employment rate higher than desired
  2) employment rate lower than last quarter
  3) interest rate decision deferred Now consider that deep NLP on a second Analysis Article (AA2) results in the following decodings/interpretation corresponding to potential hidden meaning pairings of the decoding/interpretation with the particular statement in the OFLA:
  1) employment rate higher than desired
  4) employment rate higher than last quarter
  5) interest rate unchanged Looking at these decodings/interpretations, the composite extracted translations of hidden meaning may result in retaining decoding 1 in a pairing since there are corroborating decodings, retaining decodings 3 and/or 5 in a pairing with potentially a corresponding lower confidence since they are not exact corroborations, but not retaining decodings 2 and/or 4 in a pairing since they contradict each other and do not have other corroboration.

In one illustrative embodiment, when the deep NLP runs on the AA, it extracts meaning from the aligned portions in a structure format, for example, particular entities (e.g., particular KPIs, Government Agencies, persons, etc.) and relations/attributes (e.g., KPIs can have magnitudes, direction of change, desired or anticipated magnitudes, etc.). The extracted features may be formed into a knowledge graph or other relation store. Each time a particular feature (e.g., fact, sentiment, or other feature) is found within an AA, it may e added to the composite knowledge graph or other relation store. Once the deep NLP runs on all of the AAs, the resulting composite knowledge graph or relation store may be examined to extract meaning. Quantitative rules for "believing" a particular feature in the knowledge graph or relation store may take many different forms such as "retain a feature if it was contributed by more than X % of the AAs", "retain a feature if it was contributed by X threshold of authors", "retain a feature if it was contributed X times and its opposite was not seen more than Y times", or the like. Various rules for determining what knowledge or pairings of potential hidden meaning with portions of a primary text may be utilized depending on the particular configuration and implementation of the mechanisms of the illustrative embodiments.

In some illustrative embodiments, the determination of a consensus may be a majority opinion, for example. This consensus may be an alternative subset of meanings from the set of extracted meanings corresponding to the different pairings. Other alternatives for analyzing the collection of pairings directed to the same portion of the primary text may also be utilized with the results maintained as an annotation to the pairing.

The hidden meaning statement generation logic 398 uses the pairings and their annotations to generate parallel text examples for setting forth the hidden meaning in the primary text. For example, the primary text portion of the type "The US economy has stabilized" may be translated to a parallel statement explicitly setting forth the extracted hidden meaning corresponding to a pairing, such as a consensus of the hidden meaning statement of the type "Unemployment rates have stopped falling." The probabilistic model comprising the pairings built above may employ Bayesian reasoning or any other machine learning techniques that incorporate parallel text analysis to select a most probable hidden meaning in each portion of the primary text. Unlike traditional machine translations scenarios in which two parallel texts are expected to include the same objects, predicates, and values, the extracted meaning statements and portions of text from the primary text may express widely different content. That is, in the example, above, the primary text expresses the content that the US economy has stabilized, whereas the hidden meaning statement expresses the concept that unemployment rates have stopped falling, which are two different contents even though one means the other.

The parallel text analysis performed by the hidden meaning statement generation logic 398 may be utilized to identify the most probable hidden meaning of the primary text which may then be subjected to further cognitive processing and/or output of the most probable hidden meaning. The hidden meaning statement generation logic 398 provides the identified most probable hidden meaning of the primary text to the hidden meaning statement output logic 399. The hidden meaning statement output logic 399 may operate on the identified most probable hidden meaning of the primary text to generate an output to a user, annotate the original primary text with content and/or metadata that makes explicit the hidden meaning as additional textual content associated with the primary text, update the domain specific implication lexicon data structure 393 with the association of the hidden meaning with the primary text portion to add an additional mapping to the domain specific implication lexicon data structure 393, or the like. For example, the output generated by the hidden meaning statement output logic 399 may comprise an output of a primary text portion displayed side-by-side with the hidden meaning statement to illustrate what the primary text portion actually means. In other illustrative embodiments, a range of potential hidden meaning statements may be displayed. In other illustrative embodiments, the primary text may be augmented with references to the linked secondary text portions, augmented with annotations or metadata that include the hidden meaning statements, or the like. In one illustrative embodiment, the primary text is augmented with the metadata including the hidden meaning statement text(s) such that this metadata is searchable and able to be processed by the cognitive system, and QA system pipeline 300, when analyzing the primary text. In this way, the cognitive system, and QA system pipeline 300, will not only see the literal meaning of the original primary text, but also the hidden meaning in the original primary text which can then be processed using literal-based NLP techniques, QA pipeline 300 stages, and the like, since the hidden meaning is now made explicit in the metadata. Thus, in some illustrative embodiments, the corpora or corpus 345, 347 is modified to include the hidden meaning statements generated by the present invention to thereby generate an updated corpora/corpus 345, 347 in which the hidden meaning statements are made explicit in association with the primary text portions.

To illustrate the operation of one illustrative embodiment, consider an example announcement made by Federal Reserve Chairman Janet Yellen on Aug. 22, 2014 (available at the U.S. government's Federal Reserve website). The announcement itself may serve as a trigger event that causes the mechanisms of the illustrative embodiments to be initiated, where the detection of the trigger event may be a manual or automated process, e.g., a user requesting analysis of the announcement, an automated system detecting publication of the announcement to a corpus, or the like. The initiating of the illustrative embodiments causes the announcement to be analyzed to extract features that can be used to correlate secondary text portions.

The extracted features are used to analyze the portions of the secondary texts to identify overlap, references, and common content. For example, an extracted feature of the primary text may be the author of the text and a search of secondary texts may be performed to identify "[AUTHOR] speech" or "[AUTHOR] announcement" or "[AUTHOR] press release" or the like, where "[AUTHOR]" is the extracted feature from the primary text. Moreover, the results of such searches maybe constrained by temporal characteristics, such as constraining the results to the day of the speech and several days before/after. Among the results may be an article entitled "Yellen: Job Market Shifts Complicate Rate Decision."

Additional extracted features that may be analyzed may include the location of the publication of the article, e.g., "JACKSON HOLE, Wyoming," and the phrase "Federal Reserve Chair Janet Yellen said Friday . . . " from the first paragraph of the secondary text. Such features may be useful for providing context to other extracted features. For example, a public figure may make several similar speeches from different locations on the same day. Moreover, such extracted features may be used for contextualizing probabilities such as when a speech is delivered from a particular location, e.g., the Lincoln memorial, this may impact the veiled meaning that is conveyed. Furthermore, such extracted features may be used in the scoring that is performed, e.g., if the primary text originates from the United States of America and there are two segments of secondary texts, one of which originates from some other state in the United States of America and the other from a different country, e.g., India, the first secondary text may be given a higher score because of its origin.

In finding elements of the secondary text that directly reference portions of the primary text, the following text may be found in both the primary text and the secondary text: "considerable uncertainty about the level of employment consistent with . . . " indicating that this portion of the secondary text is referencing the corresponding portion in the primary text. In identifying portions of the secondary text that state meaning of the corresponding primary text, the primary text may comprise the text:

Primary Text: " . . . a key challenge is to assess just how far the economy now stands from the attainment of its maximum employment goal. Judgements concerning the size of the gap are complicated by ongoing shifts in the structure of the labor market and the possibility that the severe recession caused persistent changes in the labor market's functioning . . . "

Secondary Text: "Federal Reserve Chair Janet Yellen said Friday that the Great Recession complicated the Fed's ability to assess the U.S. job market and made it harder to determine when to adjust interest rates."

In this example, the secondary text is anchored in the primary text as indicated by the phrases "complicated", "recession," the domain-specific correlation between "labor" and "job market", and/or by manual text alignment (e.g., a human analyst may annotate the secondary text to indicate that it is associated with a particular OFLA passage for statistical training purposes). In addition, the secondary text explains the intent of the primary text's statements to justify the Fed inaction on adjustment of interest rates.

Various other secondary text may be analyzed to identify additional evidence in support of the pairing of the secondary text portion with the primary text portion. For example, various blogs, government websites, online articles, trade or domain specific online publications, and the like, may be identified that reference concepts of job markets, recession, and the like, to determine if there is support for the association of the secondary text with the primary text.

Figure 4:
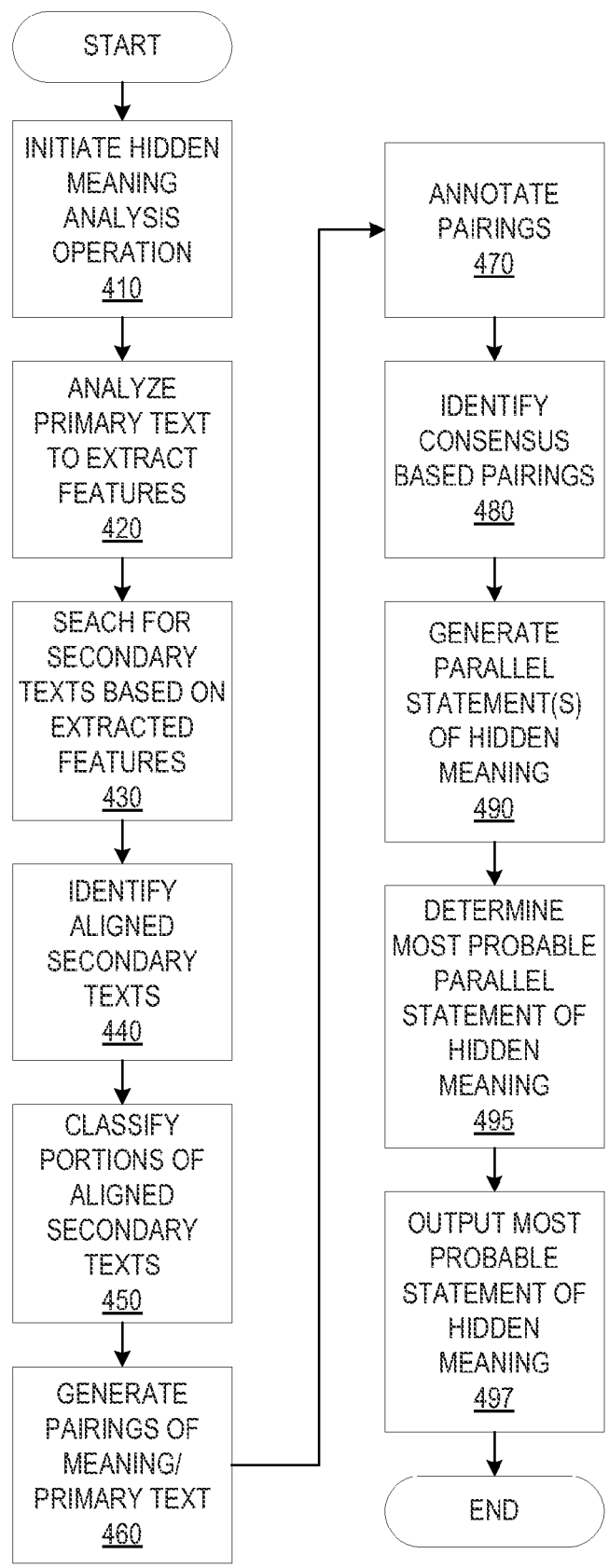
FIG. 4 is a flowchart outlining an example operation for identifying and output hidden meaning in a portion of primary text in accordance with one illustrative embodiment.

FIG. 4 is a flowchart outlining an example operation for identifying and output hidden meaning in a portion of primary text in accordance with one illustrative embodiment. As shown in FIG. 4, the operation starts with the operation being initiated in response to the issuance of a primary natural language content and/or a request for hidden meaning analysis of a primary natural language content (step 410). The primary natural language content, or primary text, is analyzed to extract one or more features (step 420). The extracted features are used to search for secondary text (step 430) which is then analyzed using natural language processing and domain-specific semantic data structures, e.g., dictionaries, lexicon data structures regarding meaning within the domain, and the like, to identify aligned secondary text (step 440).

Segments, or portions, of the text of both the secondary texts are classified into portions of text that reference the primary text, portions of text that decode meaning in the primary text, and portions of the text that reference missing or expected elements of information in the primary text (step 450). Pairings of meaning text and primary text portions are generated based on the classification of secondary text portions of the aligned secondary texts (step 460). The pairings of meaning text/primary text are annotated with contextualizing features, domain-specific semantic analysis features, temporal characteristics, etc. (step 470).

The annotated pairings are analyzed to identify consensus based pairings of meaning and primary text (step 480). From the consensus based pairings, one or more parallel statements of hidden meaning are generated (step 490). A probabilistic determination of a most probable parallel statement indicative of the hidden meaning in the primary text is selected (step 495) and an output of the most probable hidden meaning statement is generated (step 497). As noted above, this may include outputting an actual representation of the statement of hidden meaning either by itself of in association with the primary text. Another output may be to augment the corpus by associating the hidden meaning text with the primary text either by direct incorporation into the primary text, association as metadata associated with the primary text, updating a domain-specific lexicon data structure, and/or the like. The operation then terminates.

It should be appreciated that while the flowchart in FIG. 4 illustrates termination of the operation after output of the hidden meaning text, the mechanisms of the illustrative embodiments make explicit the hidden meaning in the primary text and associate that hidden meaning with the primary text such that it may be used to interpret the primary text. As such, cognitive systems may utilize the hidden meaning text when performing searches, answering questions, evaluating evidence for corroborating answers to questions, or any other cognitive processing operation. In one illustrative embodiment, the hidden meaning text associated with the primary text may be used as part of the corpus that is ingested and processed by a QA system pipeline when answering natural language questions and evaluating evidence to generated scores for candidate answers and selection of a final answer to the input question. Of course other types of cognitive systems may utilize the hidden meaning text in any manner appropriate to the implementation as if it were any other textual content processed by the system.

Thus, the illustrative embodiments provide mechanisms that utilize secondary sources of information that provide commentary or analysis of the natural language content, some prior to the publication of the natural language content and some in response to the publication of the natural language content, to provide evidentiary sources for interpreting the natural language content and extracting the hidden, implied, or veiled meaning from the natural language content. Moreover, the illustrative embodiments provide mechanisms for utilizing the hidden or veiled meaning extracted from the natural language content to improve analysis of the natural language content by cognitive systems when performing cognitive operations, such as providing predictive models in various domains, question answers, information retrieval, content searching, or the like. The mechanisms of the illustrative embodiments may generate metadata or other content to supplement the original natural language content so as to make explicit the hidden, implied, or veiled meaning in the natural language content so that this metadata or supplemental content may be utilized by the cognitive systems.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for identifying hidden meaning in a portion of natural language content, wherein the memory comprises instructions executed by the processor to cause the processor to be specifically configured to implement a hidden meaning translation engine, the method comprising:

receiving, by the hidden meaning translation engine of the data processing system, a primary portion of natural language content from one or more corpora of electronic documentation;

identifying, by the hidden meaning translation engine of data processing system, a secondary portion of natural language content, in the one or more corpora of electronic documentation, that references the primary portion of natural language content;

analyzing, by the hidden meaning translation engine of data processing system, the secondary portion of natural language content to identify indications of meaning directed to elements of the primary portion of natural language content;

generating, by the hidden meaning translation engine of data processing system, a probabilistic model based on results of the analysis of the secondary portion of natural language content modeling a probability of hidden meaning in the primary portion of natural language content;

generating, by the hidden meaning translation engine of data processing system, a hidden meaning statement data structure for the primary portion of natural language content based on the probabilistic model;

storing, by the hidden meaning translation engine of the data processing system, the hidden meaning statement data structure in association with the primary portion of natural language content in the one or more corpora of electronic documentation; and performing, by a cognitive system, a cognitive operation at least by performing natural language processing on a combination of the primary portion of natural language content and the hidden meaning statement data structure in the one or more corpora of electronic documentation, wherein analyzing the secondary portion of natural language content further comprises correlating a first temporal characteristic of the secondary portion of natural language content with a second temporal characteristic of the primary portion of natural language content, and wherein generating a probabilistic model further comprises weighting the secondary portion of natural language content based on whether the first temporal characteristic is at a prior time to the second temporal characteristic or at a later time than the second temporal characteristic.

2. The method of claim 1, wherein generating the hidden meaning statement data structure for the primary portion of natural language content based on the probabilistic model comprises generating a metadata data structure that is linked to the primary natural language content in a corpus of information, wherein the hidden meaning statement data structure explicitly specifies the hidden meaning as an explicit natural language statement in relation to the primary portion of natural language content.

3. The method of claim 1, wherein the cognitive operation is a question answering operation performed by a question and answer pipeline implemented in the data processing system.

4. The method of claim 1, wherein generating the probabilistic model based on results of the analysis of the secondary portion of natural language content modeling a probability of hidden meaning in the primary portion of natural language content comprises generating one or more pairing data structures that pairs a secondary portion of natural language content with a corresponding primary portion of natural language content, wherein the secondary portion specifies a potential hidden meaning in the corresponding primary portion.

5. The method of claim 4, wherein generating the probabilistic model further comprises:

determining which pairing data structures to maintain in the probabilistic model based on an evaluation of an amount of corroborating evidence for each pairing data structure in the one or more pairing data structures.

6. The method of claim 5, wherein generating the probabilistic model further comprises:

removing a pairing data structure from the probabilistic model in response to the pairing data structure failing to have a predetermined amount of corroborating evidence to support the pairing data structure.

7. The method of claim 4, wherein generating the probabilistic model based on the secondary portion of natural language content modeling a probability of hidden meaning in the primary portion of natural language content comprises associating with a pairing data structure, in the one or more pairing data structures, contextualizing features that specify domain conditions contemporaneous to the primary portion of natural language content.

8. The method of claim 7, wherein the contextualizing features are key performance indicators (KPIs) and corresponding KPI values for a domain of the primary portion of natural language content.

9. The method of claim 7, wherein the contextualizing features comprise annotations indicative of sentiment in at least one of the primary portion of natural language content or the secondary portion of natural language content.

10. The method of claim 4, wherein generating a hidden meaning statement data structure for the primary portion of natural language content based on the probabilistic model comprises determining a consensus result based on analysis of the one or more pairing data structures and generating the hidden meaning statement data structure based on the consensus result.

11. The method of claim 4, wherein generating the probabilistic model further comprises:
calculating a weight value for each pairing data structure in the one or more pairing data structures, wherein the calculation of the weight value is at least partially based on whether the secondary portion of natural language content is determined to be predictive or reactionary with regard to the primary portion of natural language content;
associating calculated weight values with corresponding pairing data structures in the one or more pairing data structures; and
for each pairing data structure in the one or more pairing data structures, determining whether to maintain the pairing data structure in, or discarding the pairing data structure from, the probabilistic model based on a weight value associated with the pairing data structure.

12. The method of claim 11, wherein the calculating of the weight value is further based on whether or not the secondary portion of natural language content identifies information that is missing in the primary portion of natural language content.

13. The method of claim 1, wherein generating a hidden meaning statement data structure for the primary portion of natural language content comprises performing a machine learning operation utilizing a parallel text analysis algorithm to identify a most probable hidden meaning of the primary portion of natural language based on the probabilistic model.

14. The method of claim 1, wherein identifying a secondary portion of natural language content that references the natural language content comprises:
extracting one or more features from the primary portion of natural language content; and
performing a search of a corpus of information for one or more secondary portions of natural language content that reference at least one of the one or more features from the primary portion of natural language content or reference the primary portion of natural language content as a whole.

15. The method of claim 14, wherein identifying a secondary portion of natural language content that references the natural language content further comprises analyzing the one or more secondary portions of natural language content to identify at least one of direct quotes from the primary portion of natural language content present in the one or more secondary portions of natural language content or explicit links to the primary portion of natural language content.

16. A computer program product comprising a computer readable storage medium having a computer readable program stored therein, wherein the computer readable program, when executed in a data processing system, causes the data processing system to:
receive a primary portion of natural language content from one or more corpora of electronic documentation;
identify a secondary portion of natural language content, in the one or more corpora of electronic documentation, that references the primary portion of natural language content;
analyze the secondary portion of natural language content to identify indications of meaning directed to elements of the primary portion of natural language content;
generate a probabilistic model based on results of the analysis of the secondary portion of natural language content modeling a probability of hidden meaning in the primary portion of natural language content;
generate a hidden meaning statement data structure for the primary portion of natural language content based on the probabilistic model;
store the hidden meaning statement data structure in association with the primary portion of natural language content in the one or more corpora of electronic documentation; and
perform a cognitive operation at least by performing natural language processing on a combination of the primary portion of natural language content and the hidden meaning statement data structure in the one or more corpora of electronic documentation, wherein analyzing the secondary portion of natural language content further comprises correlating a first temporal characteristic of the secondary portion of natural language content with a second temporal characteristic of the primary portion of natural language content, and wherein generating a probabilistic model further comprises weighting the secondary portion of natural language content based on whether the first temporal characteristic is at a prior time to the second temporal characteristic or at a later time than the second temporal characteristic.

17. An apparatus comprising:
a processor; and
a memory coupled to the processor, wherein the memory comprises instructions which, when executed by the processor, cause the processor to:
receive a primary portion of natural language content;
identify a secondary portion of natural language content, in the one or more corpora of electronic documentation, that references the primary portion of natural language content;
analyze the secondary portion of natural language content to identify indications of meaning directed to elements of the primary portion of natural language content;
generate a probabilistic model based on results of the analysis of the secondary portion of natural language content modeling a probability of hidden meaning in the primary portion of natural language content;
generate a hidden meaning statement data structure for the primary portion of natural language content based on the probabilistic model;

store the hidden meaning statement data structure in association with the primary portion of natural language content in the one or more corpora of electronic documentation; and perform a cognitive operation at least by performing natural language processing on a combination of the primary portion of natural language content and the hidden meaning statement data structure in the one or more corpora of electronic documentation, wherein analyzing the secondary portion of natural language content further comprises correlating a first temporal characteristic of the secondary portion of natural language content with a second temporal characteristic of the primary portion of natural language content, and wherein generating a probabilistic model further comprises weighting the secondary portion of natural language content based on whether the first temporal characteristic is at a prior time to the second temporal characteristic or at a later time than the second temporal characteristic.

* * * * *